United States Patent [19]

Hanaki

[11] Patent Number: 4,814,743

[45] Date of Patent: Mar. 21, 1989

[54] ROTARY DIRECTION DETECTING SENSOR

[75] Inventor: Akira Hanaki, Bisai, Japan

[73] Assignee: Kabushiki Kaisha Tokai Rika Denki Seisakusho, Aichi, Japan

[21] Appl. No.: 72,048

[22] Filed: Jul. 10, 1987

[30] Foreign Application Priority Data

Jul. 14, 1986 [JP] Japan ................................. 61-107909
Jul. 15, 1986 [JP] Japan ................................. 61-108581

[51] Int. Cl.$^4$ ............................................. B60Q 1/00
[52] U.S. Cl. ................................... 200/61.39; 340/476; 200/61.35
[58] Field of Search ..................... 340/54, 55, 56, 73, 340/74, 81 R, 52 R; 200/61.27, 61.28, 61.3, 61.31, 61.35, 61.38, 61.39, 16 C, 16 D; 307/115

[56] References Cited

U.S. PATENT DOCUMENTS

| | | | |
|---|---|---|---|
| 4,323,877 | 4/1982 | Morita et al. | 340/56 |
| 4,365,121 | 12/1982 | Morita et al. | 200/61.27 |
| 4,368,393 | 1/1983 | Izawa et al. | 340/56 X |
| 4,571,469 | 2/1986 | Hanaki | 200/61.54 |

*Primary Examiner*—Joseph A. Orsino
*Assistant Examiner*—Jill D. Jackson
*Attorney, Agent, or Firm*—Parkhurst, Oliff & Berridge

[57] ABSTRACT

A rotary direction detecting sensor for use on an automobile includes a pair of switching means provided radially from an axis of a steering shaft, and angularly spaced from each other at a predetermined angle about the axis. A first rotary member and a second rotary member are provided around the steering shaft, one of the rotary members being rotated in accordance with the rotation of the shaft and the other of them being limited in rotation to a substantially half angle of the angle between the switching means. In response to one direction of the rotation of the shaft, one of the switching means is selected to actuate blinking of one turn indicator lamp whereas the other of the switching means is held at its original deactivated position. On the other hand, in response to the other direction of the rotation of the shaft, the other of the switching means is selected for its operation.

14 Claims, 9 Drawing Sheets

ROTARY DIRECTION DETECTING SENSOR

BACKGROUND OF THE INVENTION

The present invention relates to a rotary direction detecting sensor for use in an automobile, and more particularly, to a detector for detecting the direction of rotation of a steering wheel.

Recently, in an automobile, a switch for blinkig a turn indicator lamp has been mounted on a place other than a steering column, such as an instrument panel. In such a case, when the steering wheel is returned to its neutral position after the completion of a turning movement of the automobile, it is required to detect the direction of rotation of the steering wheel so as to turn off the turn indicator lamp in accordance with the direction of the rotation. For this purpose, various rotary direction detecting sensors have been proposed previously, such as U.S. Pat. Nos. 4,323,877 and 4,571,469. However, in the structure of the previous rotary direction detecting sensors, a large annular space in a radial direction around a steering shaft is needed since movable contacts are provided all around the periphery of the shaft, so that the sensor becomes bulky in size.

SUMMARY OF THE INVENTION

Accordingly, it is an object of the present invention to provide a rotary direction detecting sensor having a pair of switches for detecting the direction of the rotation of the steering wheel by operating one of the switches selected in accordance with the direction of the rotation.

It is another object of the present invention to provide a rotary direction detecting sensor having a pair of switches provided radially along and angularly spaced from each other about an axis of the steering shaft.

In accomplishing these and other objects, a rotary direction detecting sensor according to the present invention comprises a stationary member receiving a rotating shaft therethrough, a first rotary member of a substantially annular configuration concentrically provided around the rotating shaft, a second rotary member of substantially annular configuration concentrically provided around the rotating shaft and rotationally offset from the first rotary member, and a pair of switching means mounted on the stationary member and angularly spaced from each other at a predetermined angle about an axis of the rotating shaft. In the above arrangement, the first rotary member and second rotary member are rotated by rotating means connected to the rotating shaft, one of the rotary members being limited in its rotation relative to the other rotary member.

Each of the switching means comprises a sliding member having a first end portion slidable on the peripheral surface of the first rotary member and a second end portion slidable on the peripheral surface of the second rotary member, a movable contact mounted thereon, and a biasing means for biasing the sliding member toward said rotating shaft. The sliding member is slidable in a radial direction of the rotating shaft.

A connecting means connects the first rotary member and the second rotary member in such a manner that both are rotatable at least between the switching means, rotation of one of the first and second rotary members being suspended in rotation with respect to the other rotary member for a substantially half angle of the predetermined angle spaced between the switching means to permit relative rotation between the first and second members to reduce the rotational offset.

A selecting means positioned between one of the first and second rotary members and a corresponding one of the first and second end portions of said switching means selects one of the switching means in accordance with the rotation of the rotary member rotated by the rotating means. The selecting means permits the sliding member of the selected switching means to move toward the rotating shaft.

In one embodiment, the sliding member of the selected switching means is moved toward the rotating shaft when the rotational offset between the first and second rotary members disappears. In another embodiment, a rotational offset is established between one rotary member and the pair of switching means, and the sliding member is moved toward the rotating shaft when the rotational offset between the rotary member and the switching means disappears.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENTS

Figure 1:
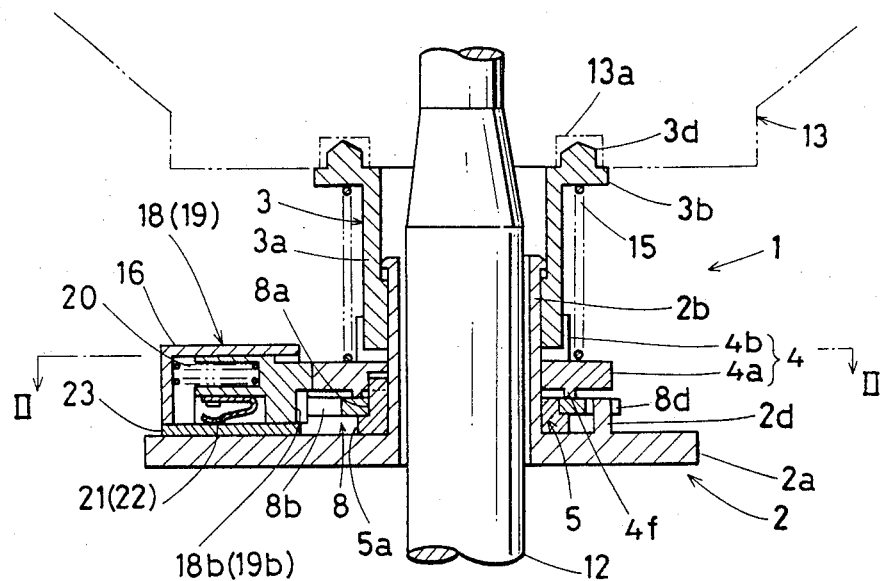
FIG. 1 is a vertical sectional view of a rotary direction detecting sensor according to the first embodiment of the present invention.
Figure 2:
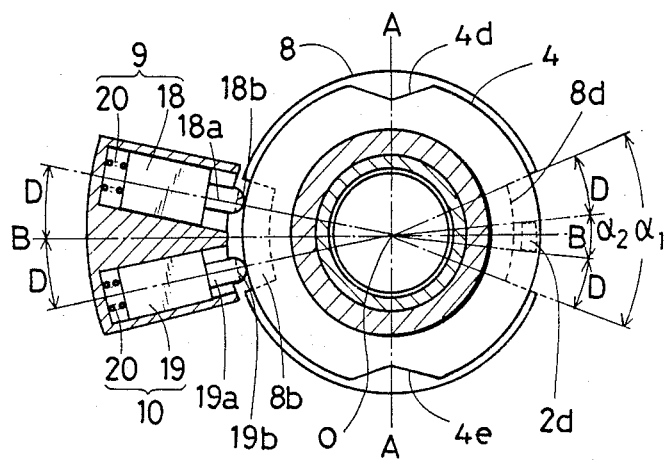
FIG. 2 is a sectional view taken along the line II—II in FIG. 1.
Figure 3:
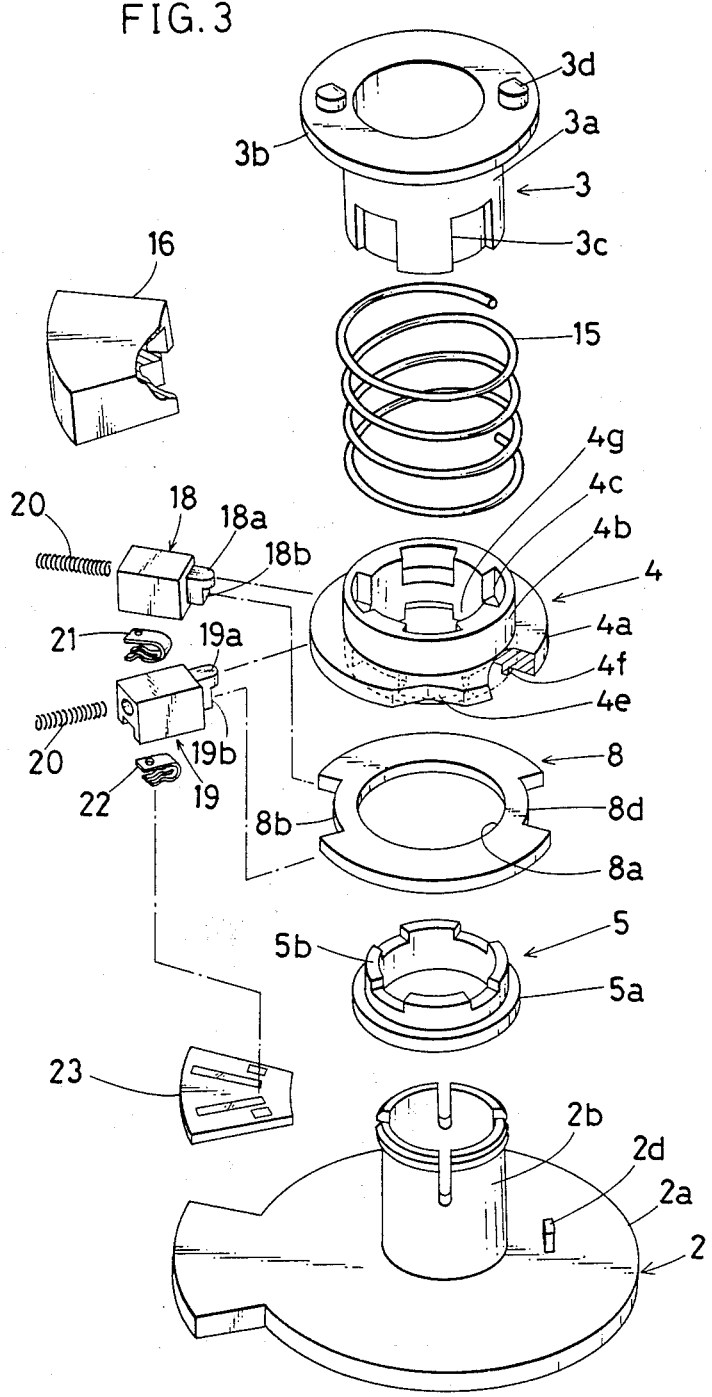
FIG. 3 is an exploded view of the rotary direction detecting sensor of FIG. 1.

Referring to FIGS. 1, 2 and 3, a rotary direction detecting sensor 1 of the first embodiment of the present invention is, for example, applied to a detector for detecting the rotary direction of a steering wheel 13 and provided around a steering shaft 12. The detecting sensor 1 comprises, as shown in FIG. 3, a stationary member 2 formed by a plate 2a having a central opening, a cylindrical support 2b mounted on the plate 2a in a coaxial relationship with the central opening and slidingly receiving the steering shaft 12 therein, and an arcuate projection 2d mounted on the plate 2a. The plate 2a is fixedly connected to a steering column (not shown).

A connecting member 5 is formed by a ring plate 5a having a plurality of projections 5b extending upwardly therefrom and defining a part of a cylinder. The connecting member 5 is rotatably mounted on the cylindrical support 2b, and slidably mounted on the plate 2a.

A lower rotor 8 is an annular plate, which has a pair of recesses 8b and 8d in its peripheral surface and central opening 8a. The lower rotor 8 is rotatably mounted on the cylinder defined by the projections 5b of the connecting member 5. Accordingly the lower rotor 8 is also mountd on the ring plate 5a and, due to frictional control, will rotate with the ring plate 5a. However, the arcuate projection 2d is loosely engaged in the recess 8d so that the second rotor 8 may rotate only within a limited rotation angle depending on an angle $\alpha 1$, defined by the width of the recess 8d and an angle $\alpha 2$ defined by the width of the projection 2d, namely a rotational angle of $(\alpha 1 - \alpha 2)$, or 2D as shown in FIG. 2.

An upper rotor 4 is formed by an annular plate 4a having a central opening and a cylindrical body 4b in a coaxial relationship with the central opening. The cylindrical body 4b is provided with a plurality of projections 4g extending downwardly defining a part of a cylinder and is rotatably mounted on the cylindrical support 2b in such a manner that the projections 4g of the upper rotor 4 alternately engage with the projections 5b of the connecting member 5 to form a complete cylinder. That is, slots between the projections 4g of the upper rotor 4 receive the projections 5b of connecting member 5, while slots between projections 5b of the connecting member 5 receive the projections of the upper rotor.

The upper or first rotor 4 is also provided with a circular wall 4f extending downwardly so as to allow the lower end thereof to contact the upper surface of the lower or second rotor 8, as shown in FIG. 1. As described below, the circular wall 4f permits limited rotation of the second rotor 8 due to frictional contact between the first and second rotors 4, 8. In the peripheral surface of the first rotor 4 is formed a pair of recesses 4d, 4e with a wide-V shape in their plan view at opposite sides of the annular plate 4a, as shown in FIG. 2. The diameter of the second rotor 8 is slightly larger than that of the first rotor 4.

A rotating member 3 is formed by a cylinder body 3a having projections 3c in a shape of a column and a ring plate 3b provided with a pair of projections 3d. The rotating member 3 is connected to the first rotor 4 in such a manner that the column projections 3c of the cylinder body 3a are inserted into interior recesses 4c formed on the inner surface of the cylindrical body 4b. The projections 3d of the rotating member 3 are engaged with bores of the steering wheel 13 as shown in FIG. 1.

Accordingly the first rotor 4 is movable with the rotating member 3 and the rotational movement of the steering wheel 13 is transmitted through the rotating member 3 to the first rotor 4 and to the connecting member 5. A coil spring 15 is mounted on the cylinder body 3a and the cylindrical body 4b between the ring plate 3b and the annular plate 4a for biasing the first rotor 4 toward the second rotor 8, and biasing the rotating member 3 toward the steering wheel 13. Accordingly, the coil spring enhances the frictional contact between the second rotor 8 and the first rotor 4, and between the second rotor 8 and the connecting member 5 so that the second rotor 8 will rotate with the first rotor 4 through the angle D until one edge of the recess 8d of the second rotor engages the projection 2d. Once engaged, the second rotor cannot rotate upon continued rotation of the first rotor 4.

The recesses 4d and 4e of thefirst rotor 4 and the recesses 8b and 8d of the second rotor 8 are formed at opposite sides of the rotors respectively, and the relative position between the first and second rotors 4 and 8 at the neutral position of the steering wheel 13 is set as shown in FIG. 2, namely the line A—A connecting the recesses 4d and 4e is perpendicular to the line B—B symmetrically dividing the recesses 8b and 8d, and the arcuate projection 2d. In other words each recess 4d, 4e of the first rotor 4 is offset initially by 90° from a corresponding recess 8b, 8d of the second rotor.

A pair of switches 9 and 10 having sliding members 18 and 19 biased by a pair of springs 20 respectively are enclosed by a switch case 16. A printed circuit board 23 having stationary contacts printed thereon, is mounted on the plate 2a, and provided adjacent to the first rotor 4 and second rotor 8. The switches 9, 10 are symetrically disposed on opposite sides of the line B—B.

The sliding members 18 and 19 are biased by a pair of coil springs 20 toward the axis O of the sliding shaft 12. The sliding members are aligned along a periphery of the first and second rotors 4 and 8 in a radical directions from the axis O of the steering shaft 12, and are symetrically spaced from each other about the line B—B at a predetermined angle of 2D about the axis O. The sliding members 18 and 19 have projections 18a and 19a as first end portions and shoulders 18b and 19b as second end portions, respectively. The projections 18a and 19a slide on the peripheral surface of the first rotor 4 in accordance with the rotation thereof, whereas the shoulders 18b and 19b slide on the peripheral surface of the second rotor 8 in accordance with the rotation thereof. Accordingly the sliding members 18 and 19 slide toward the axis of the steering shaft 12 only when both of the projections 18a and 19a and the shoulders 18b and 19b come into contact with either of the recesses 4d or 4e of the first rotor 4 and the recess 8b of the second rotor 8 respectively. For example, when the recess 4e of the first rotor and the recess 8b of the second rotor 8 are aligned (as discussed below), the projection 18a and shoulder 18b of the sliding member 18 are permitted to move inward radially toward the axis O.

The sliding members 18 and 19 have movable contacts 21 and 22 of leaf springs formed in a U-shape associated therewith respectively and slidable on the stationary contacts printed on the printed circuit board 23. Movement of the leaf springs makes the appropriate contacts on the circuit board for activation of the switches.

The rotary direction detecting sensor 1 described above is operated as follows:

The centerline A—A of the recesses 4d, 4e of the first rotor 4 are offset initially by 90° from the centerline B—B of the switches 9, 10 and recesses 8d, 8b of the second rotor 8 (FIG. 2). When the rotating member 3 is rotated clockwise (in the direction E of FIGS. 4–6) by the rotation of the steering wheel 13, the first rotor 4 and the connecting member 5 are rotated together. Since the second rotor 8 is held by frictional contact between the first rotor 4 and the connecting member 5, the second rotor 8 receives the rotational force therefrom. However, since the projection 2d is located in the recess 8d, the second rotor 8 is allowed to rotate only for half of the predetermined angle of 2D in the clockwise direction. That is, the second rotor 8 moves through the angle D before stopping at the projection 2d. After rotation through the angle D, rotation of the second rotor is suspended. Continued rotation of the first rotor 4 will reduce the offset and eventually align the recesses 4d, 4e of the first rotor with the recesses 8d, 8b of the second rotor as described below in detail.

Figure 4:
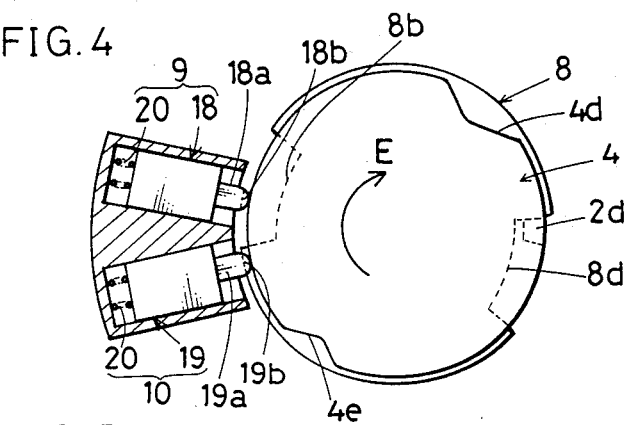
FIGS. 4, 5, 6, 7, 8 and 9 are schematic views of the switches, the first rotor and the second rotor of FIG. 2 showing how they operate.

Accordingly, with the clockwise rotation of the first rotor 4 from the position as shown in FIG. 2 wherein the centerline A—A of the recesses 4d, 4e are initially offset by 90° from the centerline B—B of the switches 9, 10 and recesses 8d, 8b, the second rotor 8 is rotated clockwise until the projection 2d comes into contact with one edge of the recess 8d. Upon further rotation as shown in FIG. 4. the first rotor 4 is rotatably offset clockwise, i.e., in the direction of E, at the angle of (90°−D) with respect to the second rotor 8 thereby reducing the initial offset between the first and second rotors. Until a counterclockwise rotational force is transmitted to the second rotor 8, it is held in the position where the recess 8b of the second rotor faces with the shoulder 18b of the sliding member 18. However, the projection 18a of the switch 9 maintains contact with the peripheral surface of the first rotor 4 so the sliding member 18 does not move radially inward.

Figure 5:
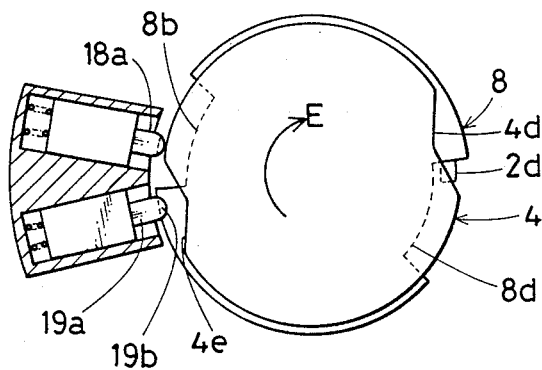

A further clockwise rotation of the first rotor 4 does not move the second rotor 8 due to engagement with the projection 2d (i.e., rotation of the second rotor is suspended), but further reduces the offset and brings the recess 4e into a position facing with the projection 19b of the switch 10 as shown in FIG. 5. The first rotor 4 is now offset at the angle of D with respect to the second rotor 8 since the second rotor has not moved from its position of engagement with the projection 2d in FIG. 4. In this position, since the shoulder 19b of the sliding member 19 is maintained in contact with the peripheral surface of the second rotor 8, the sliding member 19 does not move radially inward. Likewise, the sliding member 18 does not move due to engagement of the projection 18a with the peripheral surface of the first rotor 4.

Figure 6:
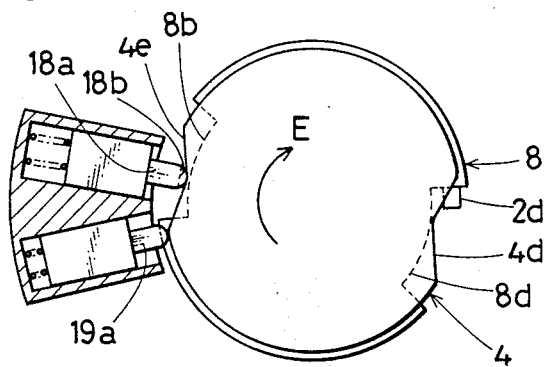

When the recess 4e faces the projection 18a by further clockwise rotation of the first rotor 4 as shown in FIG. 6, namely when the rotational offset of the first rotor 4 with respect to the second rotor 8 disappers (i.e., the recess 4e of the first rotor 4 is aligned or overlapped with the recess 8b of the second rotor 8), the sliding member 18 of the switch 9 slides toward the axis O of the first and second rotors 4 and 8. The switch 9 constitutes a switch arrangement SR that closes when the steering wheel 13 is rotated clockwise, thus detecting the clockwise rotation of the steering wheel 13.

Figure 7:
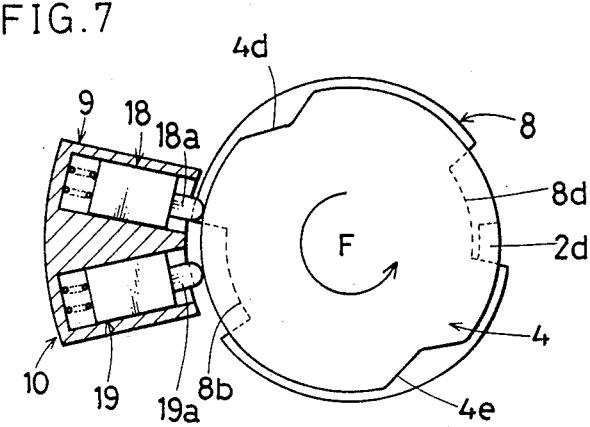

On the other hand, when the first rotor 4 is rotated counterclockwise (in the direction F of FIGS. 7–9) from its position as shown in FIG. 2 by the counterclockwise rotation of the steering wheel 13, the second rotor 8 is also rotated counterclockwise until the projection 2d comes into contact with the other edge of the recess 8d. Upon further counterclockwise rotation as shown in FIG. 7. the first rotor 4 is rotationally offset counterclockwise, i.e., in the direction of F, at the angle of (90°−D) with respect to the second rotor 8. Until the clockwise rotation is transmitted to the second rotor 8, it is held at this position.

Figure 8:
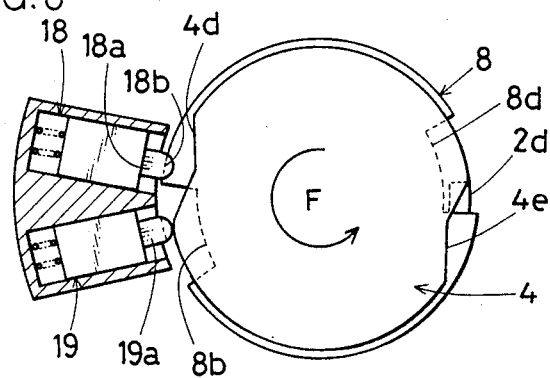
Figure 9:
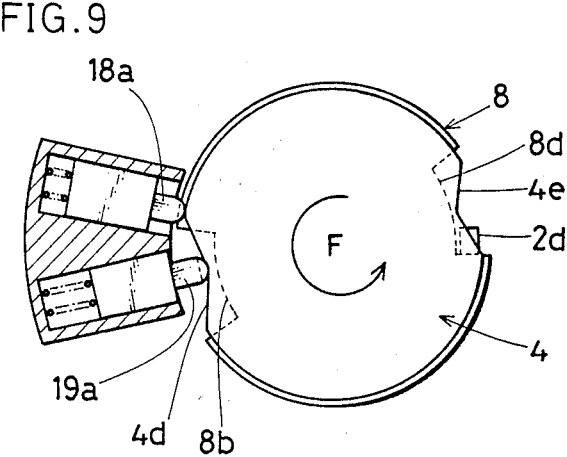

A further counterclockwise rotation of the first rotor 4 lessens the offset to the angle of D with respect to the second rotor 8 as shown in FIG. 8 but the sliding members 18 and 19 do not move. When the recess 4d faces with the projection 19a by further rotation of the first rotor 4 as shown in FIG. 9, the sliding member 19 of the switch 10 slides toward the axis of the first and second rotors 4 and 8, and the switch 10 constitutes a switch arrangement SL that closes when the steering wheel 13 is rotated counterclockwise, thus detecting the counterclockwise rotation of the steering wheel 13.

Accordingly, the switch 9 is selected in accordance with the clockwise rotation of the second rotor 8 rotated by the first rotor 4, and the switch 9 constitutes a switch arrangement SR by further clockwise rotation of the first rotor 4 offset by at least the predetermined angle D as shown in FIG. 5 from the position where the second rotor 8 stays. And, the switch 10 is always selected and activated by the counterclockwise rotation of the first rotor 4 in the same manner as described above.

The switch arrangements SR and SL are coupled with a control circuit described later in FIG. 17.

From the description of the first embodiment, a contact portion of the connecting wall 4f of the first rotor, and projection 2d and edges of the recess 8d of the second rotary member constitute a connecting mechanism which rotates the first and second rotary member between the switches, and suspends rotation of the second rotary member, thereby reducing the rotational offset betwen the first and second rotary members. Further, the recess of the second rotary member which contacts the second end portion of the sliding member is a selector for selecting one of the switches and permitting it to move radially preferably toward the rotating shaft.

Figure 10:
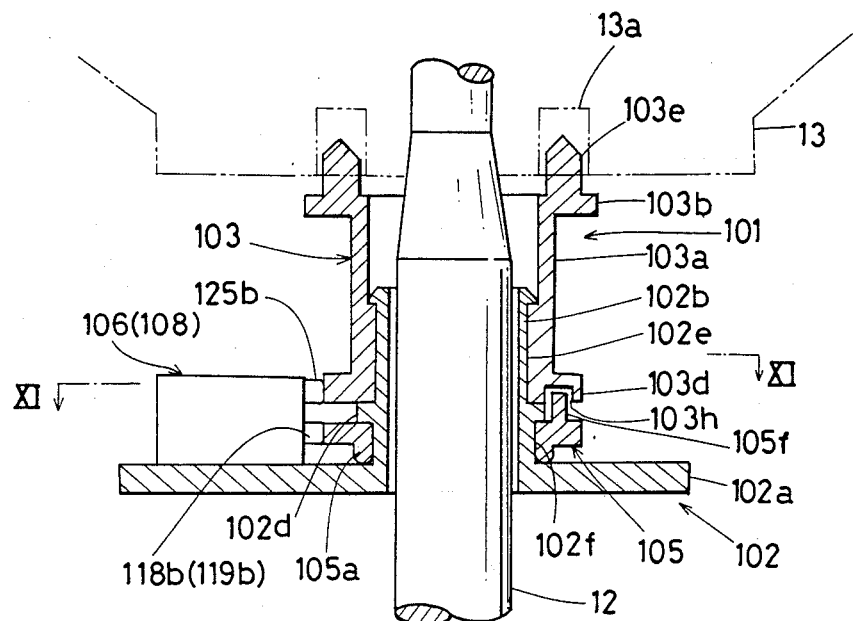
FIG. 10 is a vertical sectional view of a rotary direction detecting sensor according to the second embodiment of the present invention.
Figure 11:
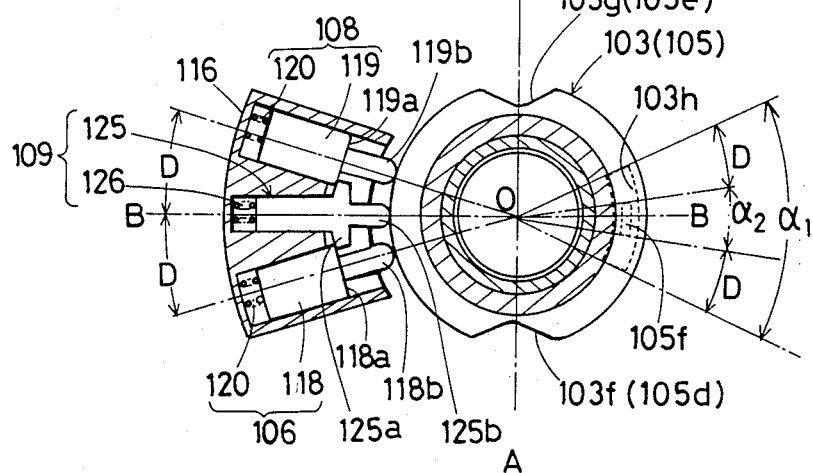
FIG. 11 is a sectional view taken along the line XI—XI in FIG. 10.
Figure 12:
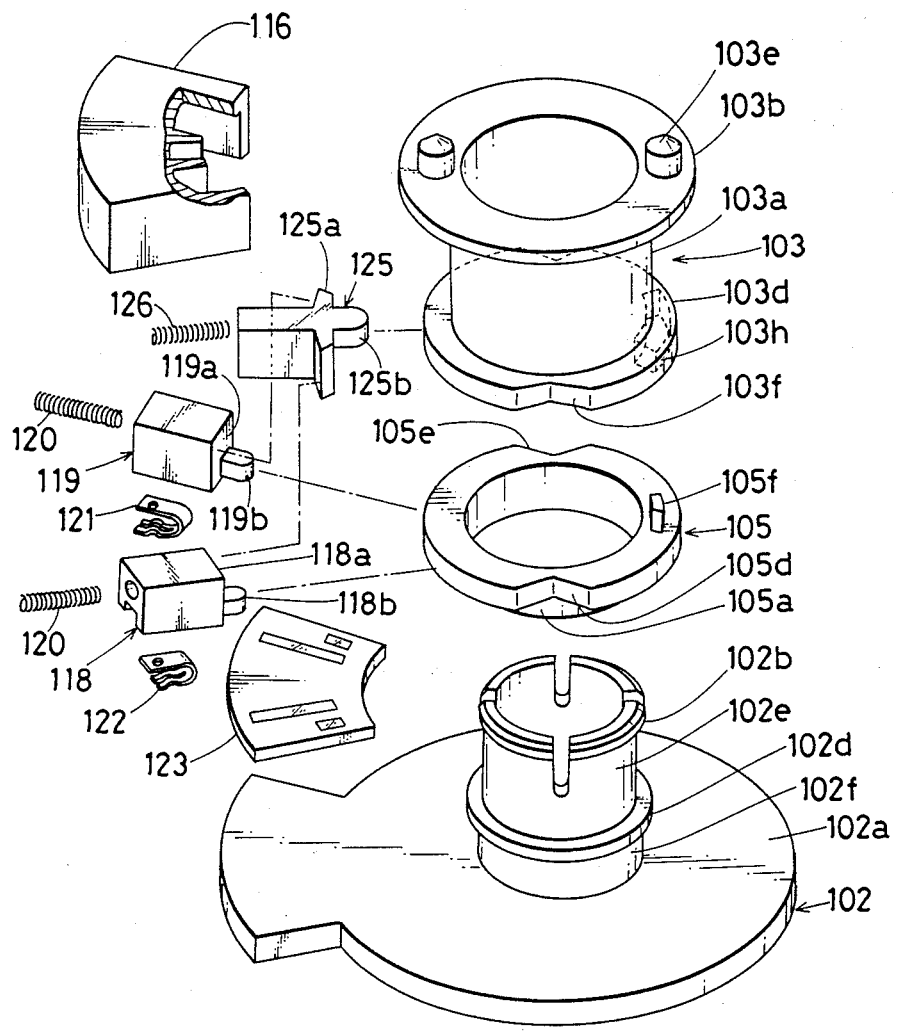
FIG. 12 is an exploded view of the rotary direction detecting sensor of FIG. 10.

Referring to FIGS. 10, 11 and 12, a rotary direction detecting sensor 101 of the second embodiment is applied to a detector for detecting the rotary direction of a steering wheel 13 and is provided around a steering shaft 12. The sensor 101 comprises a stationary member 102 formed by a plate 102a having a central opening, a cylindrical support 102b mounted on the plate 102a in a coaxial relationship to the central opening to slidingly receive the steering shaft 12 therein. The plate 102a is fixedly connected to a steering column (not shown). The cylindrical support 102b is divided by a flange portion 102d formed therearound into two portions, i.e., the upper portion 102e and the lower portion 102f whose diameter is slightly larger than the diameter of the upper portion 102e.

A first rotor 105 formed by an annular plate having a central opening, a ring portion 105a extending downwardly in a coaxial relationship with the central opening, and an arcuate projection 105f formed on the plate is fittingly inserted into and rotatably mounted on the lower portion 102f of the cylindrical support 102b. The first rotor 105 is provided with a pair of recesses 105d and 105e with a wide-V shape in their plan view. The recesses are located in the peripheral surface at opposite sides of the annular plate as shown in FIG. 11, in the line A—A perpendicular to the line B—B in which the arcuate projection 105f resides.

A second rotor 103 formed by an annular plate 103d having a central opening, and a cylinder body 103a in a coaxial relationship with the central opening is rotatably mounted on the upper portion 102e and slidably mounted on the flange portion 102d of the cylindrical support 102b. The second rotor 103 is provided with an arcuate cut-out 103h with a width of α1 angle which is engaged with the arcuate projection 105f with a width of a smaller angle α2 compared with the α1 angle as shown in FIG. 11, therefore the first rotor 105 may rotate within the rotational angle defined by the width of the arcuate cut-out 103h and the width of the arcuate projection 105f, namely the angle of (α1−α2), or 2D, with respect to the second rotor 103. Accordingly the first rotor 105 is so arranged for rotation limited to the angle D in one direction with respect to the second rotor 103.

The second rotor 103 is also provided with a pair of recesses 103f and 103g with a wide-V shape in their plan view. The recesses are located in the peripheral surface at opposite sides of the annular plate 103d as shown in FIG. 11 in the line A—A perpendicular to the line B—B by which the cut-out 103b is divided symmetrically. The diameter of the annular plate 103d is the same as that of the first rotor 105.

A ring plate 103b having a central opening and a plurality of projections 103e extending upwardly is formed with the cylinder body 103a in a coaxial relationship with the central opening. The projections 103e of the ring plate 103b are engaged with bores 13a of the steering wheel 13 as shown in FIG. 10. Accordingly, the rotational movement of the steering wheel 13 is transmitted to the second rotor 103, but not initially to the first rotor 105. The second rotor 103 thus rotates relative to the first rotor 105. When the connection between the edge of the arcuate cut-out 103h and the edge of arcuate projection 105f is established, the the first and second rotors rotate together.

Figure 10A:
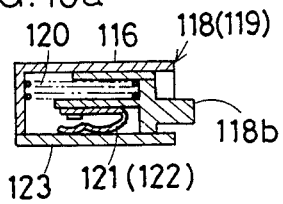
FIG. 10a is a vertical sectional view of the switch in FIG. 10.

A pair of switches 106 and 108 having sliding members 118 and 119 biased by a pair of springs 120 respectively and a blocking member 125 with a cross shape in its plan view biased by a spring 126 and interposed between the switches 106 and 108, are enclosed by a switch case 116 and a printed circuit board 123 having stationary contacts printed thereon (See FIG. 10a). The assembly is mounted on the plate 102a, and povided adjacent to the first rotor 105 and second rotor 103.

The sliding members 118 and 119 are aligned along a periphery of the first and second rotors 105 and 103 in a radial direction from the axis of the steering shaft 12, and angularly spaced from each other at the angle of 2D about the axis of the steering shaft 12 as shown in FIG. 11, symmetrically about the line B—B. The sliding members 118 and 119 are biased by a pair of coil springs 120 toward the axis of the steering shaft 12 respectively.

On the line B—B, the blocking member 125 has a pair of arms 125a engaged with and provided between the sliding members 118 and 119 respectively. The blocking member 125 is slidably mounted in the switch case 116 and biased by a spring 126 toward the axis of the steering shaft 12, so that a projection 125b formed in arcuate shape on its head portion is forced to contact the peripheral surface of the second rotor 103.

The sliding members 118 and 119 have projections 118b and 119b as first end portions and shoulders 118a and 119a as second end portions, respectively. The projections 118b and 119b slide on the peripheral surface of the first rotor 105 in accordance with the rotation thereof, wherease the shoulders 118a and 119a always contact the arms 125a of the blocking member 125, so long as its projection 125b slides on the peripheral surface of the second rotor 103 in accordance with the rotation thereof. Accordingly, the sliding members 118 and 119 slide toward the axis of the steering shaft 12 only when both of either the projection 118b or 119b and the projection 125b of the blocking member 125 come into contact with either of the recesses 105d or 105e of the first rotor and either the recess 103f or 103g of the second rotor 103 respectively.

The sliding members 118 and 119 have movable contacts 121 and 122 of leaf springs formed in U-shape associated therewith respectively and slidable on the stationary contact printed on the printed board 123, as shown in FIG. 10a. The sliding of the spring makes the appropriate contacts on the printed circuit board for activation or deactivation of a turning signal lamp.

Figure 13:
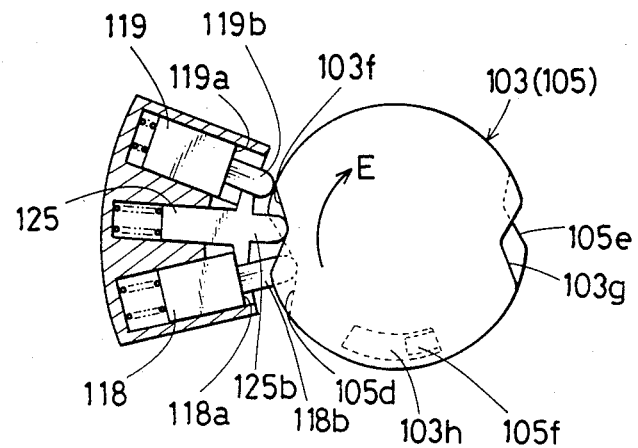
FIGS. 13, 14, 15 and 16 are schematic views of the switches, the first rotor and the second rotor of FIG. 11 showing how they operate.

The rotary direction detecting sensor 101 described above is operated as follows:

In the initial position (FIG. 11), the recesses 105e, 105d of the first rotor 105 are aligned with the recesses 103g, 103f, respectively of the second rotor 103. The centerline A—A of the recesses 103g and 103f of the second rotor are offset by 90° from centerline B—B of the switches 106, 108. When the second rotor 103 is rotated clockwise by the rotation of the steering wheel 13, in the direction of E as shown in FIG. 13 from the position as shown in FIG. 11, the second rotor 103 is rotated relative to the first rotor 105 through a half of the predetermined angle 2D (i.e., the angle D) with respect to the first rotor 105. Rotation of the first rotor 105 is suspended until the end face of the arcuate cut-out 103h and the end face of the arcuate projection 105f are engaged in accordance with the continued rotation of the second rotor 103. In this position, the recesses 103g and 105e are no longer aligned, but offset by the angle D. A rotational offset between the centerline A—A of the recess 103f and 103g and the centerline B—B of the switches is established, the rotational offset being the angle 90−D.

Upon continued rotation of the second rotor 103 and first rotor 105, the rotational offset between the centerline A—A and centerline B—B is reduced. When the rotatioal offset between the centerline A—A and B—B disappears, the recess 103f of the second rotor 103 faces with the projection 125b of the blocking member 125, and the latter slides toward the axis of the second rotor 103 by the biasing means 126 and comes into contact with the former, i.e., the recess 103f, whereby the shoulders 118a and 119b become free from the engagement with the arms 125a of the blocking member 125. Simultaneously, the recess 105d of the first rotor 105 faces with the projection 118b of the sliding member 118, so that the projection 118b moves toward the recess 105d and comes into contact therewith, whereas the sliding member 119 does not move since the projection 119b contacts the peripheral surface of the first rotor 105. Accordingly, the switch 106 constitutes a switch arrangement SR that closes when the steering wheel 13 is rotated clockwise to reduce the offset between the centerline of the recesses on the first rotor and the centerline of the switches, thus detecting the clockwise rotation of the steering wheel 13.

Figure 14:
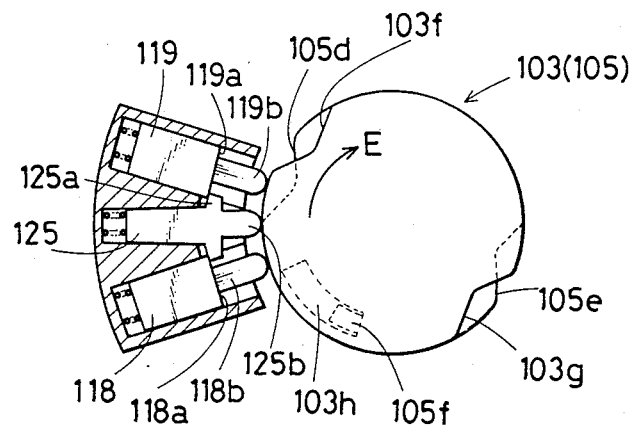

When the blocking member 125 returns to its original position by further rotation of the second rotor 103 as shown in FIG. 14, the sliding member 118 also returns to its original position since its projection 118b slides on the peripheral surface of the first rotor 105 and also its shoulder 118a engages with the arms 125a of the blocking member 125. Although the projection 119b faces with the recess 105d, the shoulder 119a is engaged with the arm of the blocking member 125, so that the sliding member 119 is stopped from sliding toward the recess 105d and held at its original position.

Figure 15:
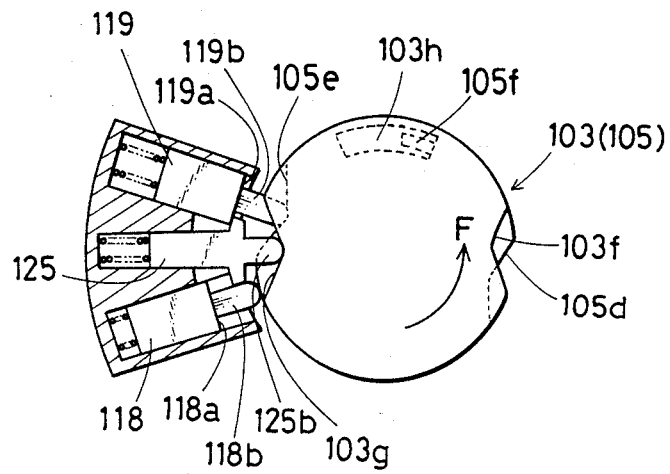

On the other hand, when the second rotor 103 is rotated counterclockwise from its position as shown in FIG. 11 by the counterclockwise rotation of the steering wheel 13, i.e. in the direction of F as shown in FIG. 15, the second rotor 103 is rotated counterclockwise through the angle of D with respect to the first rotor 105. Rotation of the first rotor 105 is suspended until the appropriate edge of the cut-out 103*h* engages the opposite end face of the arcuate projection 105*f*. At that time, the first and second rotors rotate together with their respective recesses being offset by the angle D. The centerline A—A of the recesses of the first rotor are rotationally offset from the centerline B—B of the switches by the angle 90—D.

When the rotational offset disappears, the centerline A—A and centerline B—B are aligned. In this position, the recess 103*g* of the second rotor 103 faces with the projection 125*b*, and the blocking member 125 slides toward the recess 103*g* and comes into contact therewith, so that the arms of the blocking member 125 also move toward the recess 103*g*. At this time, the recess 105*e* of the first rotor 105 faces with the projection 119*b* of the sliding member 119, so that the projection 119*b* moves toward the recess 105*e* and comes into contact therewith, whereas the sliding member 118 contacts with the peripheral surface of the first rotor 105. Accordingly, the switch 108 constitutes a switch arrangement SL that closes when the steering wheel 13 is rotated counterclockwise, thus detecting the counterclockwise rotation of the steering wheel 13.

Figure 16:
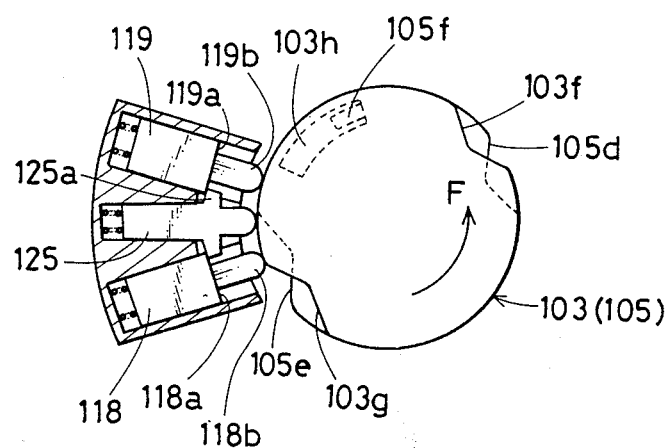

When the blocking member 125 returns to its original position by further rotation of the second rotor 103 as shown in FIG. 16, the sliding member 119 also returns to its original position since its projection 119*b* slides on the peripheral surface of the first rotor 105 and also its shoulder 119*a* engages with the arm 125*a* of the blocking member 125. Although the projection 118*b* faces with the recess 105*e*, the shoulder 118*a* is engaged with the arm 125*a* of the blocking member 125, so that the sliding member 118 is stopped from sliding toward the recess 105*e* and held at its original position.

Accordingly, the switch 106 is selected in accordance with the clockwise rotation of the first rotor 105 rotated by the second rotor 103 and contitutes a switch arrangement SR, whereas the switch 108 is selected in accordance with the counterclockwise rotation of the same and constitutes a switch arrangement SL. And these switch arrangements SR and SL are coupled with a control circuit described below with regard to FIG. 17.

In accordance with the second embodiment, the cut-out in the second rotary member and the projection on the first rotary number define a connection mechanism so that both rotary members are rotatable at least between the switches, and rotation of one rotary member is suspended for the angle D in relation to the other rotary member, thereby permitting relative rotation to establish a rotational offset between the other rotary member and the pair of switching means. Further, the recesses of the second rotary member and the blocking member select the appropriate switch in accordance with corresponding rotation.

Figure 17:
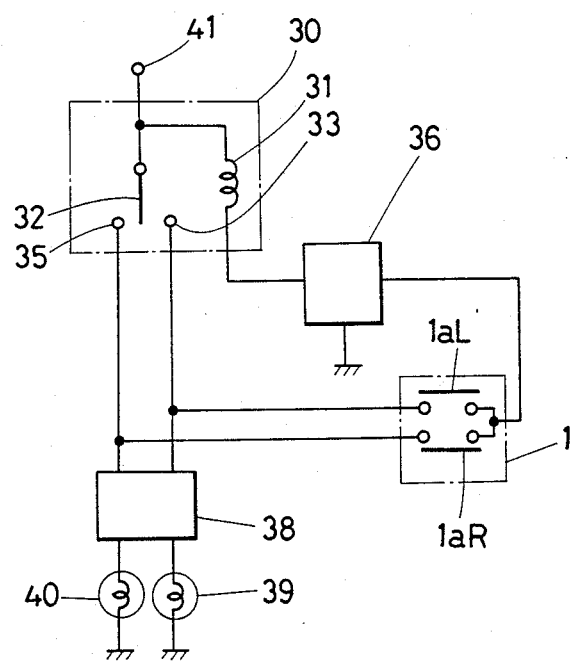
FIG. 17 illustrates a circuit diagram showing a control circuit coupled with the rotary direction detecting sensor of any one of the embodiments.

Refering to FIG. 17, a control circuit is operatively provided in association with the switch arrangements SR and SL of the rotary direction detecting sensor of any one of the embodiments described above.

A turn indicator switch unit 30 comprises a turn switch 32 manually operated fro indicating a right or left turn and provided with a terminal 33 connected to a right indicator lamp 39 via a flasher unit 38 and a terminal 35 connected to a left indicator lamp 40 via the flasher unit 38. The turn switch 32 is connected to a terminal 41 for a power supply (not shown).

The turn indicator switch unit 30 further comprises a solenoid coil 31 which returns the turn switch 32 so positioned as to connect to either the terminal 33 or 35 to its neutral position as shown in FIG. 17 when the solenoid coil 31 is energized.

The solenoid coil 31 is connected to the terminal 41 at one side and connected at the other side to an actuating circuit 36 which is so operated as to energize the solenoid coil 31 in accordance with a signal transmitted by the switches 1aR and 1aL whose terminals are connected to the terminal 35 and terminal 33 respectively. The switch 1aR constitutes the switch arrangement SR previously described when it closes and the switch 1aL constitutes the switch arrangement SL when it closes. Accordingly, the switches 1aR and 1aL are closed in accordance with the rotation of the rotary direction detecting sensor.

In operation, when the turn switch 32 is connected to the terminal 33 for right turn, the flasher unit 38 is actuated and the right indicator lamp 39 blinks.

The switches 1aR and 1aL do not close when the steering wheel 13 is located at its neutral position.

When the steering wheel 13 is turned to the right, namely clockwise direction, the switch arrangement SR is constituted, so that the switch 1aR is closed. However, this closing of the switch 1aR does not give any influence on the circuit to the actuating circuit 36, since the terminal 35 is not connected to the power supply by the turn switch 32 which is connected to the terminal 33.

When the steering wheel 13 is turned in the reverse direction after the right turn is completed, the switch arrangement SL is constituted, so that the switch 1aL is closed, whereas the switch 1aR is open. Accordingly, a circuit formed with the terminal 41, the turn switch 32, the terminal 33, the switch 1aL and the actuating circuit 36 is completed, so that the solenoid coil 31 is energized, whereby the turn switch 32 is returned to its neutral position and the right indicator lamp 39 is turned off. The solenoid coil 31 is, accordingly, de-energized since the circuit to the actuating circut 36 is disconnected at the terminal 33.

Regarding the left turn of the steering wheel 13, the left indicator lamp 40 blinks and is turned off in the same manner as described above with respect to right turns.

Since the rotating direction of the rotating member can be detected only through the sliding movement of the sliding member and movable contacts of the switch, the sliding portion is limited and the overall dimensions of the device can be reduced. Further, since the input-output contact can be constituted by two point contacts, contact resistance is small and as a result the durability of the device is improved.

It should be apparent to one skilled in the art that the above-described embodiment is merely illustrative of but a few of the many possible specific embodiments of the present invention. For example, the rotary members can be designed to move the sliding members of the switches radially outward away from the rotating shaft. Numerous and various other arrangements can be readily devised by those skilled in the art without departing from the spirit and scope of the invention as defined in the following claims.

What is claimed is:

1. A rotary direction detecting sensor comprising:

a stationary member receiving a rotating shaft therethrough;

a first rotary member having a substantially annular configuration concentrically provided around said rotating shaft and at least one recess formed in a peripheral surface thereof;

a second rotary member having a substantially annular configuration concentrically provided around said rotating shaft and at least one recess formed in a peripheral surface thereof, said at least one recess of said second rotary member being shifted relative to the at least one recess of the first rotary member to establish a rotational offset between said first and second rotary members;

rotating means connected to said rotating shaft for rotating one of said first and second rotary members around said rotating shaft;

a pair of switching means mounted on said stationary member, and angularly spaced from each other at a predetermined angle about an axis of said rotating shaft, each of said switching means comprising a sliding member having a first end portion slidable on a peripheral surface of said first rotary member and a second end portion slidable on a peripheral surface of said second rotary member, a movable contact associated with said sliding member, and a biasing means for biasing said sliding member toward said rotating shaft, said sliding member being slidable in a radial direction of said rotating shaft;

connecting means for selectively rotatably connecting said first rotary member and said second rotary member so that both are rotatable at least between said pair of switching means, rotation of one rotary member being suspended by a substantially half angle of said predetermined angle between said pair of switching means in relation to rotation of the other rotary member to permit relative rotation between first and second rotary members to reduce said rotational offset between said first and second rotary members; and selecting means position between one of said first and second rotary members and one of said first and second end portions of said switching means and engageable with said one of said first and second rotary members, for selecting a selected one of said switching means in accordance with the rotation of said rotary member rotated by said rotating means and for selectively moving said sliding member of said selected switching means in a radial direction;

said sliding member of said selected switching means being moved in a radial direction of said rotating shaft into said at least one recess of each rotary member when said rotational offset between said one of said first and second rotary members disappears with respect to the other rotary member.

2. A rotary direction detecting sensor of claim 1, wherein said selecting means is positioned between said second end portion of said switching means and said second rotary member, and said first rotary member comprises an annular plate having said at least one recess formed in the peripheral surface thereof, said first end portion of said selected switching means as selected by said selecting means sliding on said peripheral surface to move toward said rotating shaft when said first end portion faces with said recess in contact therewith in accordance with the rotation of said rotary member rotated by said rotating means.

3. A rotary direction detecting sensor of claim 2, wherein said at least one recess is a first recess in each rotary member, and wherein said first and second rotary members each comprise an annular plate having the first recess formed in the peripheral surface thereof and a second recess formed in peripheral surface at the opposite side of said first recess.

4. A rotary direction detecting sensor of claim 3, wherein said connecting means comprises a contact portion of said first rotary member held in contact with said second rotary member for producing a frictional force between said contact portion and said second rotary member, and a projection provided on said stationary member for slidably engaging with an edge of said first recess of said second rotary member to limit said second rotary member to rotate between said switching means.

5. A rotary division detecting sensor of claim 4, wherein said selecting means comprises said second recess of said second rotary member rotatably positioned to face the second end portion of one of said switching means when said second rotary member is rotated in one direction, and the second end portions of the other of said switching means when said second rotary member is rotated in the other direction.

6. A rotary direction detecting sensor of claim 1, wherein the sliding member of the selected switching means is moved in a radial direction toward said rotating shaft.

7. A rotary direction detecting sensor comprising:

a stationary member receiving a rotating shaft therethrough;

a first rotary member having a substantially annular configuration concentrically provided around said rotating shaft and at least one recess formed in a peripheral surface thereof;

a second rotary member having a substantially annular configuration concentrically provided around said rotating shaft and at least one recess formed in a peripheral surface thereof;

rotating means connected to said rotating shaft for rotating at least one of said first and second rotary members around said rotating shaft;

a pair of switching means mounted on said stationary member, and angularly spaced from each other at a predetermined angle about an axis of said rotating shaft, each of said switching means comprising a sliding member having a first end portion slidable on a peripheral surface of said first rotary member and a second end portion movable in sliding relationship with a peripheral surface of said second rotary member, a movable contact associated with said sliding member, and a biasing means for biasing said sliding member toward said rotating shaft, said sliding member being slidable in a radial direction of said rotating shaft;

connecting means for selectively rotatably connecting said first rotary member and said second rotary member so that both are rotatable at least between said pair of switching means, and rotation of one of the rotary members is suspended by a substantially half angle of said predetermined angle between said pair of switching means in relation to rotation of the other rotary member to permit relative rotation between the rotary members and establish a rotational offset between the other rotary member and the pair of switching means; and selecting means positioned between one of said first and second rotary members and one of said first and second end portions of said switching means and engageable with said one of said first and second rotary members, for selecting a selected one of said switching means in accordance with the rotation of said rotary member rotated by said rotating means and for selectively moving said sliding member of said selected switching means in a radial direction;

said sliding member of said selected switching means being moved in a radial direction of said rotating shaft into said at least one recess of each rotary member when said rotational offset between the other rotary member and said pair of switching means disappears.

8. A rotary direction detecting sensor of claim 7, wherein said selecting means is positioned between said second end portion of said switching means and said second rotary member, and said first rotary member comprises an annular plate having said at least one recess formed in the peripheral surface thereof, said first end portion of said selected switching means as selected by said selecting means sliding on said peripheral surface to move toward said rotating shaft when said first end portion faces with said recess in contact therewith in accordance with the rotation of said rotary member rotated by said rotating means.

9. A rotary direction detecting sensor of claim 8, wherein said at least one recess is a first recess in each rotary member, and wherein said first and second rotary members each comprise an annular plate having the first recess formed in said peripheral surface thereof and a second recess formed in said peripheral surface at the opposite side of said first recess.

10. A rotary direction detecting sensor of claim 9, wherein said connecting means comprises a cut-out formed in said second rotary member for engaging a projection formed in said first rotary member, said projection slidably moving within said cut-out.

11. A rotary direction detecting sensor of claim 10, wherein said selecting means comprises said first and second recesses of said second rotary member and a blocking member interposed between said pair of switching means and biased toward said rotating shaft, said blocking member having a projection slidably contacting a peripheral surface of said second rotary member and a pair of arms engaged respectively with each second end portion of said switching means to thereby stop said switching means from moving toward said rotating shaft when said projection of said blocking member is in contact with said peripheral surface of said second rotary member, and to allow said switching means to move toward said rotating shaft when said projection is in contact with one of said first and second recesses of said second rotary member.

12. A rotary direction detecting sensor of claim 11, wherein said switching means and said blocking member are enclosed by a switch case and a printed circuit board having stationary contacts printed thereon, said switch case and circuit board being mounted on said stationary member, said movable contact associated with said sliding member being slidably mounted on said printed circuit board.

13. A rotary direction detecting sensor of claim 11, wherein said second rotary member is provided with said rotating means.

14. A rotary direction detecting sensor of claim 7, wherein the sliding member of the selected switching means is moved in a radial direction toward said rotating shaft.

* * * * *